Patented July 23, 1940

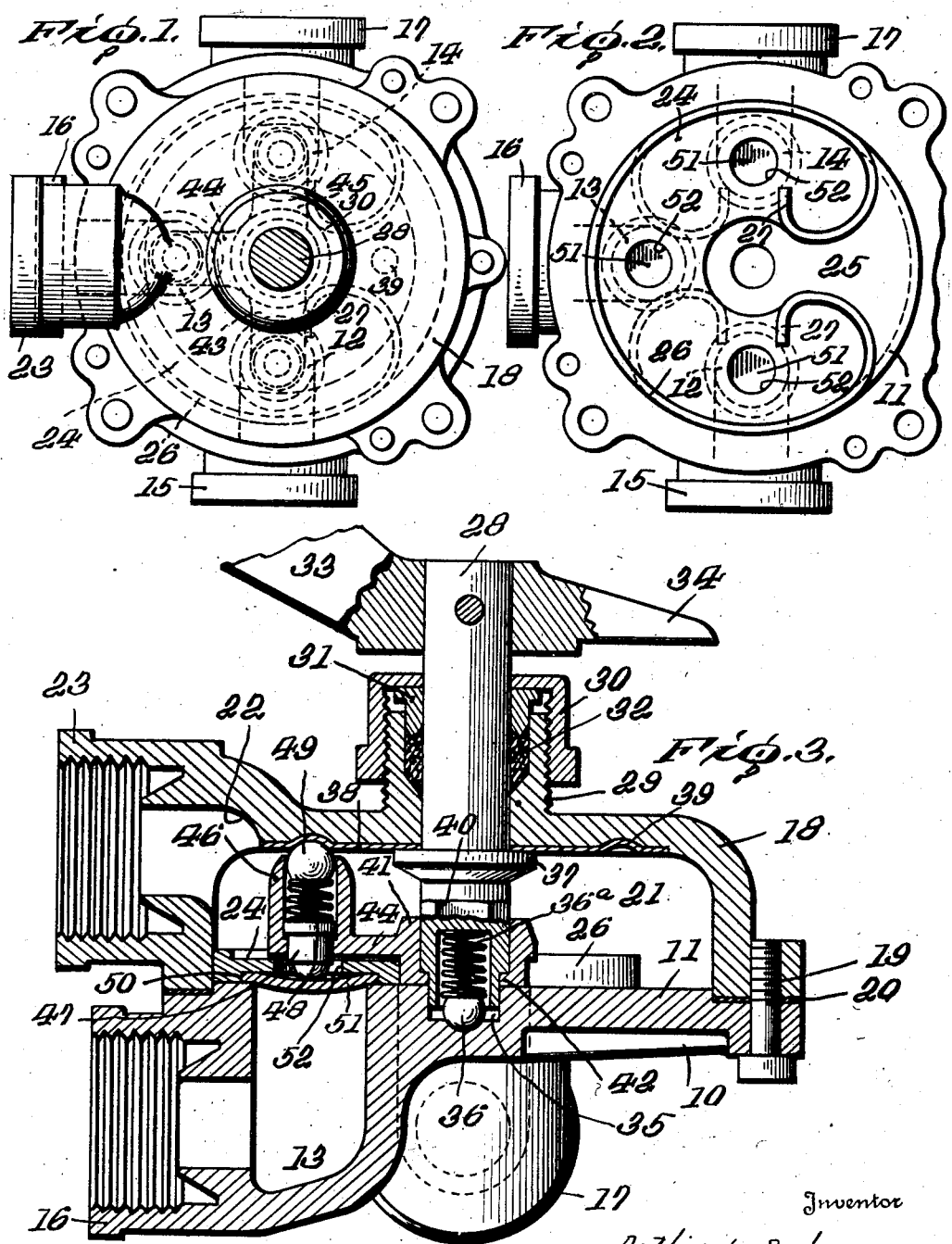

2,209,132

UNITED STATES PATENT OFFICE 2,209,132

VALVE ASSEMBLY

Arthur L. Parker, Cleveland, Ohio

Application March 17, 1938, Serial No. 196,537

3 Claims. (Cl. 251—84)

The present invention relates to new and useful improvements in a valve assembly, and more particularly to improvements in a valve assembly of the general type shown and described in Letters Patent, No. 2,075,458, granted to me on March 30, 1937.

In the above prior patent, there is shown a valve assembly which is adapted to selectively control the passage of fluid through a plurality of ports. The valve assembly is one which is particularly adapted to selectively control the passage of fluid from a series of inlet ports to a single outlet port, or vice versa. The valve member includes generally a body having a seat provided with a plurality of ports, and a chambered cap which is attached to the body and which covers the seat. The cap is provided with an outlet or discharge port and a valve member is disposed within the chamber defined by the cap and the body. This valve member is in the form of a disc rotatably mounted within the chamber for selectively controlling the passage of fluid through the ports. In the above patent, the valve disc is flexible and means are provided for turning the valve disc and for flexing the same centrally of the ports in the valve seats so as to afford a tight sealing contact. According to the present invention, the valve member is rigid and is rotated in substantially the same manner as shown in my aforesaid patent.

An object of the present invention is to provide a valve assembly of the above type, wherein the rigid valve member is provided with a separate valve insert which is concentric with a port and adapted to overlie the port when in a position for closing the same and which may be uniformly flexed centrally of the port for effecting a tight sealing contact.

A further object of the invention is to provide a valve assembly of the above type, wherein the valve member is provided with a pocket or recess for receiving the valve insert.

A further object of the invention is to provide a valve assembly of the above type, wherein resilient means extending through the valve member are provided for flexing the valve insert centrally of the port when the insert is disposed thereover.

A still further object of the invention is to provide a valve assembly of the above type, wherein the valve inserts are made of a flexible metal which may be formed without accurate machining, thus minimizing the cost of manufacture and simplifying the assembly.

The above and other objects of the invention will in part be obvious, and will be hereinafter more fully pointed out.

In the accompanying drawing:

Figure 1 is a top plan view of the improved valve assembly.

Figure 2 is a plan view showing the valve body with the cap removed, the full lines showing the position of the valve member when covering all of the ports, and the broken lines showing the position of the valve member when one of the ports is uncovered.

Figure 3 is a vertical section through the valve assembly of Figure 1.

The valve assembly, as shown in the illustrated embodiment of the invention, includes a body portion 10 which provides a valve seat 11. The body portion is provided with a plurality of inlet ports 12, 13, 14, which open through the valve seat. These ports communicate with internally threaded couplings 15, 16, 17, respectively, to which conduits may be attached. The conduits leading from the couplings may be connected to separate tanks for supplying a fluid. A valve cap 18 is secured to the valve body 10 by means of bolts 19 or the like. A gasket 20 is disposed between the valve cap 18 and the body portion 10 to prevent leakage of fluid. The valve cap 18 defines a chamber 21 between the top thereof and the valve seat 11. A port 22 leads from this chamber to an internally threaded coupling 23 to which an outlet pipe may be attached. This outlet pipe leads to the desired location where the fluid is to be delivered.

Located within the chamber 21 is a valve member 24 in the form of a disc which is shaped to provide a space 25 which may be brought into register with one of the inlet ports so as to afford a free passage for the fluid from this port into the chamber 21. The valve member is provided with an integral flange 26 which extends around the periphery thereof and along the sides of the passage 25. The inner ends 27 of the flange extend outwardly and into the body of the valve member. The flange 26 serves to stiffen the valve member. The valve member contacts with the valve seat 11 and the flange 26 makes intimate contact with the inner wall of the cap 18.

A valve operating stem 28 extends centrally through the cap 18. The cap is provided with an integral upstanding sleeve portion 29 which surrounds the valve stem 28. The sleeve portion 29 is externally threaded to receive the threads on a packing cap 30 which bears against a packing follower 31. Disposed between the follower 31 and the lower portion of the sleeve 29 is a packing 32. Thus, the packing cap presses the follower against the packing material in order to provide a tight joint between the valve stem and the cap. The outer end of the valve stem is provided with an operating handle 33 which is preferably provided with a pointer 34 to indicate the setting of the valve member relative to the inlet ports.

The lower end of the valve stem, that is, the end which is disposed within the chamber 21, extends into a recess 35 in the valve body 10. This lower end of the valve stem 28 is internally bored to provide a housing for a spring-pressed ball 36 which contacts with a seat at the bottom of the recess 35. The valve stem 28 is provided with a flange 37 disposed within the chamber 21. The spring 36a bearing on the ball 36 tends to force the valve stem upwardly so that the flange 37 makes a tight turning fit with a plate 38. This plate 38 is suitably secured to the top of the valve cap 18 and is provided with recesses 39 which are spaced symmetrically with respect to the ports in the valve body 10.

A portion of the lower end of the valve stem 28 above the recess 35 is hexagonal in cross section, as indicated at 40. A hub 41 has the interior surface thereof similarly shaped, that is, hexagonally, and the hexagonal portion 40 of the valve stem 28 fits within the hub. The lower end of the hub is provided with an internal shoulder 42 which is disposed beneath the hexagonal portion 40 of the valve stem. Thus, rotation of the valve stem 28 will effect similar rotation of the hub 41. The hub carries three radially extending arms 43, 44, 45, which overlie the valve member 24. The ends of the radial arms are each provided with an upstanding sleeve 46, these sleeves being disposed substantially the same distance from the valve stem as the central axes of the inlet ports. A stud 47 is carried in the lower end of each sleeve and a spring 48 bears against the stud. In the upper end of each sleeve is a ball 49 against which the spring 48 also bears. Thus, the spring 48 tends to force the ball and the stud outwardly.

The inner ends 27 of the flange 26 on the valve member 24 engage the sides of the radial arms 43 and 45 so that rotation of the valve stem and the radial arms will effect corresponding rotation of the valve member 24. The valve member 24 is provided with pockets or recesses 50. These recesses are symmetrically spaced with respect to the inlet ports and are of a greater diameter. A circular valve disc or insert 51 is disposed in each of the pockets or recesses 50 and each insert 51 is concentric with a port when closed and overlies the port a uniform amount. The valve disc is of a diameter greater than the diameter of the inlet ports so that the edges thereof are held within the pockets 50 by the valve seat 11. These valve inserts are of metal, preferably of stainless steel, and are flexible in order to afford a tight seat around the port or ports which are to be closed. Directly above each valve disc 51, the valve member 24 is provided with an aperture 52. Thus, the studs 47 extend through the apertures 52 and bear centrally on the valve inserts 51.

When the valve member is in the position shown in Figures 1 and 3, the inlet ports 12, 13, 14, are closed. In this position of the valve member, the valve discs 51 are disposed directly over the respective inlet ports, and the studs 47, extending through the apertures 52 in the valve member, are forced downwardly by the springs 48 so as to flex the valve discs centrally into the ports, as particularly shown in Figure 3. Thus a tight seal is effected around the edges of the ports. The recesses 39 in the plate 38 are entered by the balls 49 so as to properly locate or position the valve member directly over the desired ports.

When the valve stem 28 is rotated by manipulation of the handle 33, the valve inserts 51 will be caused to move through their engagement with the pockets 50 and ride up on the valve seat 11 against the action of the springs 48 so as to permit shifting of the valve member. Thus, the valve assembly is one which can selectively control the passage of fluid from any one of the inlet ports 12, 13, 14, to the outlet or discharge port 22.

From the foregoing description, it will be seen that the springs 48 and studs 47 constitute flexing means which are disposed centrally of the valve discs 51. The valve discs are made of a light material, preferably metal, and the pressure of the flexing means on the valve discs when the ports are closed thereby, will uniformly flex or bend the discs centrally into the ports within the elastic limit thereof. Thus, a tight seal is effected with the edges around the ports to be closed.

A specific embodiment of the invention has been shown in the accompanying drawing, but it is to be clearly understood that various changes in the details of construction and arrangement of parts may be made without departing from the scope of the invention as set forth in the appended claims.

I claim:

1. A valve assembly comprising a valve casing having a port therethrough, a rotatable rigid valve member mounted within said casing and having a recess in the under face thereof opening downwardly and concentric with said port when closed, said recess being of a diameter greater than the diameter of said port, a flexible valve insert of a slightly greater diameter than the diameter of said port and disposed within said recess and movable with said valve member and concentric with the port when closed, and means disposed centrally of the recess in said valve member and bearing centrally on said insert for uniformly flexing the said insert centrally of the port when closed whereby to afford a uniform tight sealing contact with the edge thereof.

2. A valve assembly comprising a valve casing having a port therethrough, a rotatable rigid valve member mounted within said casing and having an aperture therethrough disposed centrally of the port when closed, said valve member having a recess in the under face thereof opening downwardly and concentric with the aperture therethrough and of a diameter greater than the diameter of said port, a flexible valve insert of slightly greater diameter than the diameter of said port and disposed within said recess and movable with said valve member and concentric with the port when closed, and means extending centrally through the aperture in said valve member for uniformly flexing the said insert centrally of the port when closed whereby to afford a uniform tight sealing contact with the edge thereof.

3. A valve assembly comprising a valve body having a seat provided with a plurality of ports, a chambered cap secured to said body and covering said seat and having a port leading therefrom, a rigid valve member rotatably mounted in contact with said seat and having apertures therethrough spaced symmetrically with respect to the ports in said valve seat and disposed centrally of said ports when closed, said valve member having in the under face thereof similarly spaced recesses concentric with said apertures and adjacent said valve seat, said recesses being of a diameter greater than the diameter of said ports, a plurality of flexible valve discs of a diameter slightly greater than the diameter of said ports, one each of said valve discs being disposed within one of said recesses for closing the ports, said valve discs being movable with said valve member and concentric with said ports when closed, and resilient means movable with said valve member and extending centrally through said apertures for bearing centrally against the said valve discs whereby to uniformly flex the same centrally of the ports to be closed in order to effect a uniform tight seal around the edges thereof.

ARTHUR L. PARKER.